United States Patent [19]

Coonrod

[11] 3,859,409

[45] Jan. 7, 1975

[54] METHOD OF MAKING A FIBER REINFORCED PLASTIC ARTICLE

[75] Inventor: William C. Coonrod, Richardson, Tex.

[73] Assignee: Fibergrate Corporation, Dallas, Tex.

[22] Filed: Aug. 21, 1972

[21] Appl. No.: 282,224

Related U.S. Application Data

[63] Continuation-in-part of Ser. No. 32,270, April 27, 1970, abandoned.

[52] U.S. Cl. .................. 264/295, 264/136, 264/137, 264/294, 264/339
[51] Int. Cl. ....................... B29d 15/00, B29c 17/02
[58] Field of Search .......... 264/339, 136, 137, 294, 264/295

[56] References Cited
UNITED STATES PATENTS

| | | | |
|---|---|---|---|
| 2,510,693 | 6/1950 | Green | 85/1 R |
| 3,042,567 | 7/1962 | King | 264/137 |
| 3,495,494 | 2/1970 | Scott | 85/1 R |
| 3,530,212 | 9/1970 | Kienle | 264/137 |

*Primary Examiner*—Richard R. Kucia
*Attorney, Agent, or Firm*—Richards, Harris & Medlock

[57] ABSTRACT

A solid, elongated fiber reinforced molded plastic article is provided which contains continuous reinforcing fibers extending helically throughout its longitudinal cross section, and wherein the fibers are loaded in the body in an amount of at least about 27 percent of the axial cross sectional area of the article, and wherein the article has a protrusion such as a screw thread integrally molded on its longitudinal periphery, and the continuous fibers in the peripheral portion of the article are formed in undulations within the protrusion and thereby generally conform to the shape of the protrusion. The plastic article is molded from a preform made of a deformable plastic material having continuous reinforcing fibers extending throughout its length and in an amount of at least about 27 percent of the axial cross sectional area of the preform by (1) initially distorting the preform by torsion, causing the fibers to helically distort within the preform and thereafter (2) axially compressing the preform in an enclosed mold zone to cause distortion of peripheral portions of the preform and corresponding distortions of the fibers to yield the molded shape and thereafter solidifying the shape to yield the article.

23 Claims, 6 Drawing Figures

PATENTED JAN 7 1975 3,859,409
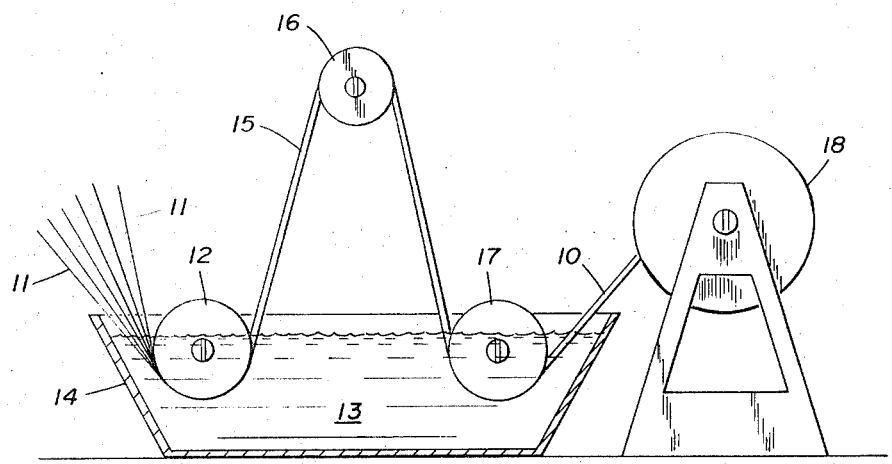
FIG. 1
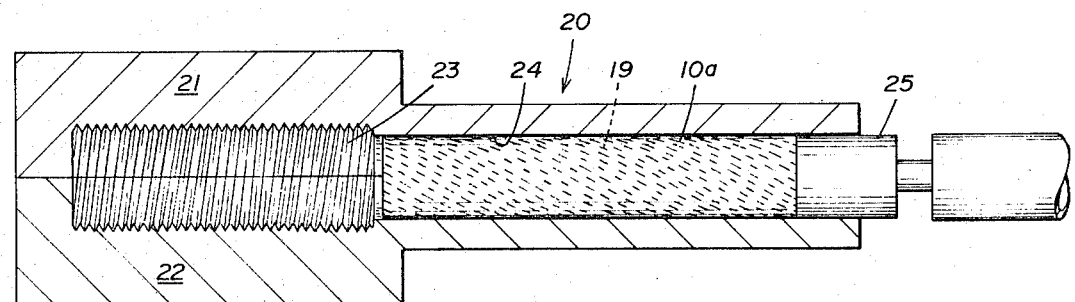
FIG. 2
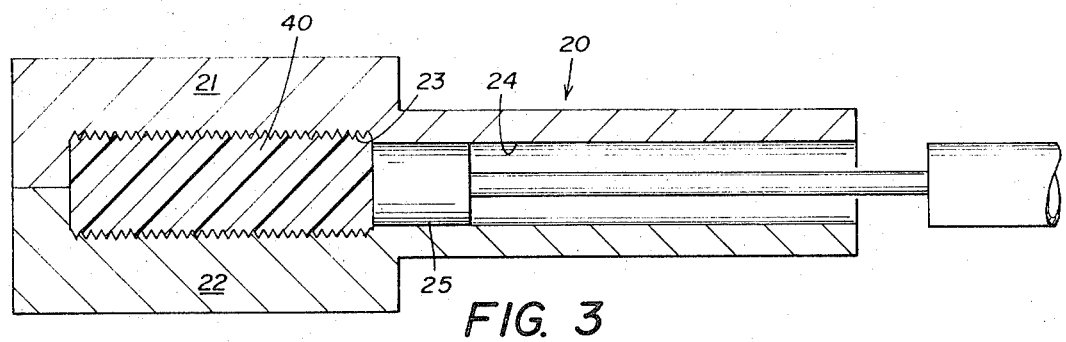
FIG. 3
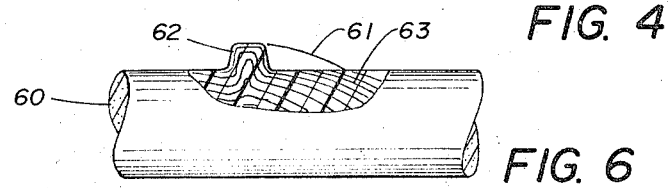
FIG. 5
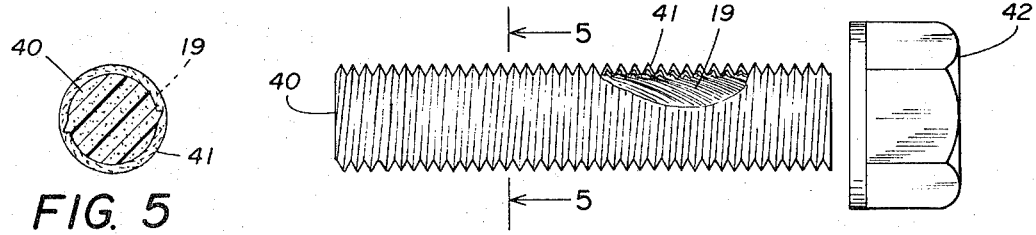
FIG. 4
FIG. 6

METHOD OF MAKING A FIBER REINFORCED PLASTIC ARTICLE

This application is a continuation-in-part of copending application Ser. No. 32,270 filed Apr. 27, 1970 and now abandoned.

This invention relates to molding. In another aspect, this invention relates to a novel fiber reinforced plastic article and a method of making the same.

Elongated, fiber reinforced plastic articles such as threaded bolts, studs and the like, are conventionally formed by initially molding a non-threaded body from a plastic material containing either very short fibers dispersed therein or fibers contained continuously throughout a cross section thereof. Threads are then cut into the molded body by conventional machining operations. An example of such a process is disclosed in U.S. Pat. No. 2,510,693.

The threaded objects formed in this manner are generally satisfactory for lower strength operations. However, these objects do not perform satisfactorily in operations wherein relatively great shearing stress is applied to the machined threads.

Efforts have been made to form objects with threads having greater shear resistance than described above. For example, several processes have been devised wherein fiber reinforced molded threads are formed on an article wherein the fibers are contained transversely through the article, or wound in convolutions conforming to the threads. Examples of such processes are disclosed in U.S. Pat. Nos. 2,629,894 and 2,949,054.

These processes, while providing a better reinforced screw thread, are generally cumbersome and expensive to conduct, since they require specially designed equipment. In addition, while the threads or protrusions on resulting formed objects are reinforced, the reinforcement generally does not enhance the shear and torsion strength of the elongated object.

Recently, processes have been utilized such as disclosed in U.S. Pat. No. 3,495,494 for producing fiber reinforced plastic threaded objects which contain continuous reinforcing fibers throughout the length of the object and wherein the fibers in the peripheral portions of the object are distorted to conform to the shape of the threads. Such techniques generally include initially molding a preform containing continuous longitudinally extending reinforced fibers throughout the length of the preform and thereafter molding the object from the preform either by straight compression molding while restraining the ends of the preform or by applying only axial compressive force to the preform within an enclosed mold zone. Such processes are generally satisfactory for producing the fiber reinforced threaded objects having a relatively low fiber loading. However, such techniques cannot be utilized to produce higher strength fiber reinforced objects. For example, when these processes are utilized to mold objects from fiber reinforced preforms containing more than about 50 weight percent of continuous glass reinforcing fibers, the fibers do not uniformly distribute throughout the body of the article and throughout the integrally molded screw threads.

Specifically, it has been found in attempting to produce fiber reinforced plastic articles from preforms containing high fiber loadings, e.g., above about 50 weight percent glass fibers, by the above method using axial compressive force within an enclosed mold zone, the fibers will form at least one large kink in the body of the article. This results not only in the molded protrusions being generally resin rich and not containing uniformly distributed fibers, but also in an inherent tension strength weakness of the resulting article. Likewise, when such preforms are utilized in straight compressive molding operations, when the ends of the fibers are restrained, it is found that the molded screw threads containing the fibers of conforming shape cannot be uniformly produced.

Therefore, one object of this invention is to provide a novel, fiber reinforced plastic article.

Another object of this invention is to provide a novel method of producing a fiber reinforced plastic article having highly shear resistant protrusions and/or indentations on its periphery.

A further object of this invention is to provide a novel fiber-reinforced plastic threaded member with highly shear resistant threads.

Further objects of this invention are to provide a novel fiber reinforced plastic article having high tension and torsional strength and high shear resistant protrusions and/or indentations on its periphery which is molded from a preform containing a relatively high content of continuously extending reinforcing fibers, and a method of making same.

According to the invention, a novel, elongated fiber reinforced plastic article is provided, having continuous reinforcing fibers extending helically throughout the longitudinal cross section thereof, and having such fibers present in an amount of at least about 27 percent of the axial cross sectional area of the article, said article further having a protrusion integrally molded on its longitudinal periphery, and said continuous fibers in the peripheral portion of said article being formed in undulations within said protrusion and thereby generally conforming to the shape of said protrusion.

According to one embodiment of this invention, the above-described plastic article is molded from an elongated preform of a deformable plastic material having reinforcing fibers longitudinally placed therethrough in an amount of at least about 27 percent of the axial cross sectional area of the preform by a process which includes initially distorting the preform by torsion, causing the fibers to helically distort within the preform and thereafter compressing the preform with axial compressive force in an enclosed mold zone to cause distortion of peripheral portions thereof with corresponding distortions of fibers therein to yield a molded shape and thereafter solidifying the molded shape to yield the plastic article.

In essence, I have found that when the longitudinally fiber reinforced preform contains a fiber loading such that about 27 percent or more of the preform's axial cross sectional area contains fiber, then the individual fibers within the preform react differently in the conventional molding processes than when the preform contains less fiber loadings. It appears that at the lower fiber loadings, the individual fibers within a preform have a higher degree of freedom to distort during the axial compression molding process without adversely affecting the degree of freedom of adjacently located fibers. Thus, at the lower fiber loadings, individual fibers will distort in direct proportion to the axial compressive force that is placed upon each fiber and each fiber has the freedom to randomly distort throughout the body of the preform while the peripheral fibers can be easily molded into protrusions such as screw threads and thereby form undulations within the screw threads. Thus, such articles of low fiber content can preferably be molded by applying axial compressive force to such a preform within a closed mold. The external fibers will generally uniformly mold into the protrusions and the fibers on the interior of the article will randomly distort as the preform is compressed. In addition, such articles can be molded by straight compression molding of the preform within a mold wherein the ends of the preform are restrained. The longitudinal compressive force will distort the fibers on the periphery of the preform while the fibers toward the interior of the preform can be displaced in direct proportion to the compressive force applied along the body of the preform.

I have found that when the continuous fiber loading in the preform is about 27 percent or more of the axial cross sectional area of the preform, e.g., more than about 50 weight percent of continuous glass fibers in a thermosetting preform, then the preform cannot be effectively utilized with the above-described conventional molding techniques. It is believed that the individual fibers compacted into the preform do not have sufficient freedom to beneficially distort in response to the conventional molding operation. More specifically, when utilizing such preforms in longitudinal compressive molding in a mold zone wherein the ends of the fibers are restrained, the fiber mass becomes compact and unyielding with the result that a defective article is formed which does not contain uniformly undulating fibers within the protrusions such as screw threads on the periphery. The screw threads tend to be resin rich and the fibers extrude in the flash formed in the molding operation. In addition, when such preform in utilized in a mold zone wherein axial compression molding force is applied to the preform, the fibers kink and distort as a unit. Generally, at least one large fiber kink is formed in the interior of the body by the mass of fibers which yields a body having poor tensile strength. In addition, the fibers on the periphery of the preform do not uniformly spread into the screw threads as undulations as the objects are being molded.

I have found that elongated fiber reinforced molded plastic articles carrying a protrusion such as a screw thread integrally molded on the periphery thereof and wherein the elongated fibers are formed in undulations within the protrusion and containing a relatively large percentage of reinforcing fibers (having at least about 27 percent of the axial cross sectional area of the article as fibers) can be molded by:

a. initially distorting the preform by torsion so that the fibers will extend helically throughout the length of the preform, and
b. thereafter compressing the preform with axial force in an enclosed mold zone causing distortion of the peripheral portions of the preform and corresponding distortions of the fibers therewithin to yield the molded shape.

The resulting article contains the uniform distribution of fibers throughout the length thereof and throughout the protrusions molded on the periphery thereof. In addition, the fibers within the protrusions are distorted in undulations to generally conform to the shape of the protrusions.

This invention can be more easily understood from a study of the drawings in which:

FIG. 1 is a schematic illustration depicting a process of making fiber reinforced thermosetting preforms, which can be used in the scope of this invention;

FIG. 2 is an elevational view partially in section of a suitable mold and preform which can be used in the scope of this invention;

FIG. 3 is a view of the mold of FIG. 2 with the plunger in extended position;

FIG. 4 is an elevational view partially in section of a threaded stud which is made in the mold of FIGS. 2 and 3;

FIG. 5 is a sectional view along lines 5—5 of FIG. 4 illustrating in broken line, the positioning of fibers within the molded threads thereof; and FIG. 6 is a partial sectional view of a shaft containing a helical locking key which is formed in the scope of this invention.

Now referring to FIG. 1, a method is illustrated for producing a continuous length of thermosetting preform 10, having fibers uniformly dispersed therein. It is to be understood that this invention is not limited to the use of thermosetting materials, but is also applicable with thermoplastic materials. However, the preferred articles of this invention are made with thermosetting materials.

As illustrated in FIG. 1, continuous fibers 11 are passed under pulley 12 and consolidated when in contact with thermosetting mixture 13 within bath container 14. Fibers 11 can be any high tensile strength reinforcing fiber known in the art, such as glass fiber, steel, nylon, tungsten, boron and the like. The type of fiber and the number of fibers utilized can vary to yield a product having the desired strength or density.

A sufficient quantity of fibers 11 are utilized to ensure that the resulting thermosetting preform made by the process in accordance with the method shown in FIG. 1 will result in more than about 27 percent of the axial cross sectional area of the resulting preform being fibers. Generally, the preforms which are utilizable within the scope of this invention contain sufficient longitudinally extending continuous fibers which will provide from about 27 to about 90 percent of the axial cross sectional area of the preform.

It is generally preferred that fibers 11 be glass fibers such as, for example, glass fibers sold by Owens Corning Company under the designation 893-AA, K filament. A preform made utilizing continuous glass fibers and having about 27 percent of its axial cross sectional area composed of the glass fibers will be over about 50 weight percent glass fiber (50 weight percent ± 5 weight percent depending on the particular resin and fiber which is utilized). Thus, preforms can be molded in accordance with this invention which contain over about 50 weight percent glass fibers, and generally which contain from about 50 to about 94 weight percent glass fibers. Thermosetting mixture 13 can be any suitable mixture such as, for example, a mixture of 40 percent polyester resin, 10 weight percent styrene monomer, 10 weight percent of a solvent such as acetone, 38 weight percent of filler materials such as silicate fillers, and 2 weight percent of a benzoyl peroxide catalyst paste. If desired, the above mixture can contain small concentrations of other additives such as pigments, wetting agents, release agents, ultraviolet absorbers, promoters, chemical thickeners such as magnesium oxide, and inhibitors.

Fibers 11 are consolidated and coated with resin mixture 13 as they pass under pully 12 to form a reinforced, preformed length of formable material 15. Preformed length 15 is passed over pulley 16 and back under pulley 17 wherein it is again coated with the resin mixture 13 to complete preform 10. Preform 10, leaving pulley 17, is dried in a conventional manner such as with a blower-type heating device (not shown in FIG. 1) to remove substantially all of the acetone solvent therefrom until a tack-free physical gel remains. After this drying step, preform 10 can be wound upon storage reel 18.

The continuous length of preform 10 is next cut into preform segments by conventional operations. These preformed segments are then molded in accordance with this invention to yield the novel products of this invention. Thus, the preformed segments comprise a generally elongated cylindrical slug having a diameter slightly less than the interior of the mold zone of tack-free thermosetting material having continuous glass fibers extending longitudinally therethrough. The preform segments which can be used in the scope of this invention will vary in relative size and shape in accordance with the final object to be molded. For example, when molding elongated objects such as studs, bolts and keyed shafts, the preform segment will have a density of from about 90 to 100 percent of the final molded object, be slightly smaller in diameter than the final molded object, and be from about 5 to 30 percent longer than the final molded object.

When molding elongated objects in accordance with this invention which contain at least about 27 percent of axial cross sectional area as fibers (over about 50 weight percent of glass reinforcing fibers), it has been found that in order to obtain a highly efficient dispersal of the fibers during a rapid molding cycle (a rapid plunger extension), it is necessary to twist the preform segment in a manner such that a majority of the fibers contained within the longitudinal axis thereof distort in a generally helical manner. Preform segment 10a which has been twisted in about a 1:4 ratio (1 convolution in 4 units of length) is shown in FIG. 2 with the fibers 19 which are contained within the peripheral portion of the preform segment shown in broken line. Preform segments 10a are conveniently twisted by merely applying torsion to either or both ends thereof. The amount of helical deformation of the fibers within each preform can vary with the particular material being utilized, and the size and shape of the object to be molded. Any uniform helical deformation of the fiber mass in the preform yields improved molding results in accordance with this invention. However, it is generally desirable to twist each preform and permanently deform the fiber mass such that peripheral fibers are permanently distorted in the preform in helical form in an amount corresponding to at least one-fourth of a convolution throughout the length of the preform. It is generally preferred, that each such peripheral fiber be distorted in helical form in an amount corresponding to at least one full convolution throughout the length of the preform. The most preferable deformations include one full convolution of the peripheral fibers for each 4 to 6 inches of length of the preform.

Preform segment 10a can be molded in accordance with this invention within mold 20. As shown in FIG. 2, mold 20 comprises a split transfer mold formed of mold halves 21 and 22, which cooperate to form mold chamber 23 in the shape of the object to be formed, which is illustrated as a threaded stud, and receiving chamber 24 which is adapted to receive preform segment 10a. Plunger 25 is shown as a hydraulically operated plunger which reciprocates within receiving chamber 24 in a manner such that when fully extended it will seal the opening of mold chamber 23. Thus, the extending action of plunger 25 will force a preform segment 10a within mold chamber 23 to form a corresponding shaped object. FIG. 3 illustrates plunger 25 in the extended position after a preform 10a has been forced into mold chamber 23 to form a threaded stud 40. Mold chamber 23 is heated by suitable means such as electric or steam coils (not shown) to thoroughly heat the molded segment within the cavity 23 to cause curing and solidification thereof and complete the formation of threaded stud 40.

After threaded stud 40 has cured, the mold halves 21 and 22 are separated and the molded object is removed therefrom. The final molded threaded stud 40 is shown in FIG. 4. This threaded stud can cooperate with a conventional plastic or metal nut 42, and the threads 41 thereof can be subjected to extremely high shearing forces without damage thereto. As shown in FIG. 5, which is a sectional view along 5—5 of FIG. 4, the molding operation described in FIGS. 2 and 3 causes the plastic and fibers 19 adjacent the periphery of preform 10a to be forced out into the thread-forming indentations within mold chamber 23 such that the fibers are distorted along their length to conform to the configuration of the threads. Thus, as shown in broken line in FIG. 5 which shows the axial cross sectional area of stud 40, fibers 19 are distorted within each thread ridge 41 along their length to thereby conform generally to the shape of the thread. Furthermore, as shown in broken lines in FIG. 5, fibers 19 are positioned within threads 41 transversely to the longitudinal axis of threaded stud 40.

Thus, as shown in FIG. 5, the generally helical fibers 19 adjacent the periphery of the preform segment 10a are forced, along with the plastic into threads 41, such that they are distorted to form undulations within threads 41 which generally conform to the shape thereof. This resulting structure yields a relatively shear insensitive protrusion (threads 41) while also providing longitudinal reinforcement in the resulting article.

It is noted that various other fiber reinforced articles can be made within the scope of this invention which contain shear resistant protrusions and/or indentations thereon. For example, FIG. 6 is a partial view of a shaft 60, carrying an integrally formed helical key 61 thereon, which has been formed in accordance with this invention. Thus, an elongated preform segment carrying the longitudinally placed continuous fibers at least throughout its periphery is molded within a cavity to conform with the external configuration of shaft 60. The resulting integrally formed key 61 contains undulations 62 of the longitudinally continuous helical fibers 63 which are formed in the same manner as the undulations within the threads are formed in threaded studs 40 as described in detail above.

It is noted, that it is within the scope of this invention to form the fiber reinforced object of this invention in situ. In this embodiment, the fiber reinforced object is formed within the cavity in which the object will function. For example, shaft 60 as illustrated in FIG. 6 can be formed within the spindle aperture of a driven member by initially forcing the twisted elongated preform segment within the cavity under axial hydraulic pressure, for example, and then allowing the thus-molded material to cure therewithin. If the preformed slug is made with thermosetting plastic material such as manufactured in accordance with FIG. 1, the thus-formed material can be heated in situ to cause curing by suitable means such as radiant heaters, sonic heaters, or the like. On the other hand, if the material is a thermoplastic, the slug can initially be heated to its deformation temperature, and then forced within the cavity to form molded shape and thereafter allowed to cool and solidify.

The following examples are given to further illustrate this invention and are not intended to limit the scope thereof.

EXAMPLE 1

Several threaded studs, similar in external shape to those illustrated in FIG. 4 were molded in an apparatus as illustrated in FIGS. 2 and 3 from preformed segments which were generally produced in a manner as illustrated in FIG. 1 except each preform contained less than about 50 weight percent glass fiber and was not twisted prior to molding. Each preform segment was cut from an elongated preform made by the process of consolidating glass fibers with a thermosetting composition. The preform was made from several smaller preforms which each contained five woven glass strands having 120 smaller strands, which were consolidated with a thermosetting mixture of 40 weight percent polyester resin, 10 weight percent styrene monomer, 10 weight percent acetone, 38 weight percent silicate filler, and 2 weight percent of a 50 percent by weight benzoyl peroxide catalyst. The smaller preforms were combined to form the resulting preform which was dried until substantially all of the acetone solvent was removed therefrom to yield a tack-free preform of approximately 1 inch in diameter. The glass content of the preform was approximately 40 weight percent. Next, the preform was cut into several 15 inch long preform segments. Each segment was molded within a mold similar to that illustrated in FIGS. 2 and 3 to yield a 12 inch long threaded stud having 8 threads per inch. In each instance, the preform segment was initially placed within the receiving chamber 24 of the mold and the hydraulic ram 25 was actuated to instantaneously force the slug within mold chamber 23. The ram pressure was approximately 2,000 p.s.i. The mold cavity 23 was heated to a temperature of about 300°F and the molded material was allowed to cure within the mold for approximately 5 minutes. This molding cycle yielded uniform, threaded studs.

EXAMPLE 2

Preform segments of the thermosetting material such as described in Example 1 were formulated except that the glass content within each segment was approximately 52 weight percent. The resulting 15 inch segments were twisted such that the peripheral fibers formed one helical convolution in each 4 inches of segment length. The twisted segments were placed within the receiving chamber of the mold and molded in accordance with the procedure as outlined in Example 1 to yield uniform, high strength threaded studs having external and internal configurations generally as set forth in FIGS. 4 and 5. Several of the preform segments containing 52 weight percent of the glass fibers were molded without the twisting operation as described above. The resulting molded objects were very non-uniform in nature in that the resulting glass fibers formed one large kink adjacent the middle of the molded object and did not spread uniformly through the threads in a reinforcing manner as shown in FIGS. 4 and 5.

It is to be understood that suitable molds can be utilized in the scope of this invention that apply pressure via plungers to both ends of the preform within the molding zone. Furthermore, it is to be noted that the subject process is particularly suitable for producing threaded studs 40 such as illustrated in FIG. 4 which contain a sharp V thread such as thread 41 thereon. In addition, the subject improved process can be advantageously utilized to mold other thread shapes in the scope of this invention, for example, the American National Standard Thread, the square thread, the buttress thread, Whitworth's thread, and the like. Furthermore, it must be noted that while the articles such as the threaded studs molded in accordance with this invention have an inherent increase in tensile strength which is attributed to the larger amount of fibers within the body, they also possess an unexpected increase in torsional strength. It has been found that the articles molded in accordance with this invention display an increase in torsional strength of up to 20 percent greater than would be expected by a mere increase of fiber content in the body. Furthermore, the increase in torsional strength is inherent in articles molded in accordance with this invention whenever torsional force is applied either clockwise or counterclockwise to the article.

While this invention has been described in relation to its preferred embodiments, it will be understood that various modifications will now be apparent to one skilled in the art upon reading this specification, and it is intended to cover such modifications as fall within the scope of the appended claims.

I claim:

1. A method of molding an elongated solid plastic threaded rod containing continuous reinforcing fibers extending throughout the longitudinal cross section thereof, said rod having a helical screw thread integrally molded on the longitudinal periphery thereof, and said continuous fibers in the peripheral portion of said rod being formed in undulations uniformly within said helical thread throughout the length of said rod from its ends throughout the shank portion thereof and thereby generally conforming to the shape of said thread, and said fibers being present in said threaded rod in an amount of at least about 27 percent of the axial cross sectional area of said rod, said method comprising:

a. forming a preform made of a deformable plastic material having continuous reinforcing fibers extending continuously through the axial portion thereof, and the peripheral fibers of said preform being permanently distorted in said preform in a helical manner in an amount corresponding to at least one-fourth of a convolution throughout the length of said preform, and said fibers being present in an amount of at least about 27 percent of the axial cross sectional area of said preform;

b. compressing said preform with axial force in an enclosed mold zone having a shape corresponding to said plastic article to cause said elongated preform to shorten in length and expand such that peripheral portions of said preform containing said continuous helically distorted fibers distort to correspond to the interior of said mold zone to form said thread, said fibers in said thread being in the form of undulations to yield a molded shape of said threaded rod; and c. solidifying said molded shape to yield said plastic article.

2. The method of claim 1 wherein said peripheral fibers are distorted in a helical manner in an amount corresponding to at least one full convolution throughout the length of said preform.

3. The method of claim 1 wherein said peripheral fibers are deformed one full convolution for each 4 to 6 inches of length of said preform.

4. The method of claim 1 wherein said fibers are glass fibers.

5. The method of claim 4 wherein said plastic material comprises a thermosetting resin.

6. The method of claim 5 wherein said continuous glass fibers are present in said preform in an amount in the range of from about 50 weight percent to about 94 weight percent thereof.

7. The method of claim 1 wherein said continuous elongated fibers are contained within said preform in an amount from at least about 27 to about 90 percent of the axial cross sectional area thereof.

8. A method of molding an elongated plastic article having a helical screw thread positioned on its periphery, from an elongated preform made of a deformable plastic material having reinforcing fibers longitudinally extending therethrough, comprising:

a. molding a preform of said deformable plastic material which contains said continuous fibers in an amount of at least about 27 percent of the axial cross sectional area of the preform;

b. distorting said elongated preform by torsion causing fibers in the peripheral portions thereof to permanently helically distort within said preform such that when subjected to axial force they will continue their helical deformation and expand radially of said preform;

c. applying axial compressive force on the said distorted preform within an enclosed mold zone, causing said preform to shorten in length and expand such that peripheral portions thereof containing said helically distorted fibers are distorted into the shape of said screw thread and thereby conform to the interior of said mold zone, said peripheral portions having corresponding undulations of fibers formed therein, to thereby yield a molded shape of said plastic article; and solidifying said molded shape to yield said plastic article.

9. The method of claim 8 wherein said distorting causes said peripheral fibers to distort in said preform in helical form in an amount corresponding to at least one-fourth a convolution throughout the length of said preform.

10. The method of claim 8 wherein said peripheral fibers are distorted in a helical manner in an amount corresponding to at least one full convolution throughout the length of said preform.

11. The method of claim 8 wherein said peripheral fibers are deformed one full convolution for each 4 to 6 inches of length of said preform.

12. The method of claim 8 wherein said fibers are glass fibers.

13. The method of claim 12 wherein said plastic material comprises a thermosetting resin.

14. The method of claim 13 wherein said continuous glass fibers are present in said preform in an amount in the range of from about 50 weight percent to about 94 weight percent thereof.

15. The method of claim 8 wherein said continuous elongated fibers are contained within said preform in an amount from at least about 27 to about 90 percent of the axial cross sectional area thereof.

16. In a method of molding an elongated plastic article having integrally molded protrusions thereon from an elongated preform made of a deformable plastic material having reinforcing fibers longitudinally extending therethrough, the improvement comprising:

a. forming a preform made of said deformable plastic material which contains said continuous fibers in an amount of at least about 27 percent of the axial cross sectional area of said preform;

b. distorting said preform by torsion, causing said fibers to helically distort within the peripheral portions thereof such that when axial force is applied to the ends of said fibers they will continue their helical distortion and move in a path generally radially of said preform;

c. applying axial compressive force to said distorted preform within an enclosed mold zone to cause said preform to shorten in length and expand in diameter such that peripheral portions thereof with said helical peripheral fibers are distorted into protruding shapes in said mold zone which conform to the interior of said mold zone, with corresponding distortions of said fibers in the protrusions being also formed as undulations to yield said molded shape; and d. solidifying said molded shape to yield said plastic article.

17. The method of claim 16 wherein said distorting causes said peripheral fibers to distort in said preform in helical form in an amount corresponding to at least one-fourth a convolution throughout the length of said preform.

18. The method of claim 16 wherein said peripheral fibers are distorted in a helical manner in an amount corresponding to at least one full convolution throughout the length of said perform.

19. The method of claim 16 wherein said peripheral fibers are deformed one full convolution for each 4 to 6 inches of length of said preform.

20. The methog of claim 16 wherein said fibers are glass fibers.

21. The method of claim 20 wherein said plastic material comprises a thermosetting resin.

22. The method of claim 21 wherein said continuous glass fibers are present in said preform in an amount in the range of from about 50 weight percent to about 94 weight percent thereof.

23. The method of claim 16 wherein said continuous elongated fibers are contained within said preform in an amount from at least about 27 to about 90 percent of the axial cross sectional area thereof.

* * * * *